(12) United States Patent
Jeong

(10) Patent No.: US 7,810,161 B2
(45) Date of Patent: *Oct. 5, 2010

(54) APPARATUS AND METHOD FOR MOVING CONTENTS AFTER MUTUAL AUTHENTICATION

(75) Inventor: Jae Yoon Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

This patent is subject to a terminal disclaimer.

(21) Appl. No.: 12/167,201

(22) Filed: Jul. 2, 2008

(65) Prior Publication Data

US 2008/0289048 A1 Nov. 20, 2008

Related U.S. Application Data

(60) Continuation of application No. 11/228,360, filed on Sep. 19, 2005, now Pat. No. 7,665,145, which is a division of application No. 10/022,889, filed on Dec. 20, 2001, now Pat. No. 6,965,975.

(30) Foreign Application Priority Data

Mar. 31, 2001 (KR) ................. 17207/2001
Mar. 31, 2001 (KR) ................. 17208/2001

(51) Int. Cl.
G06F 7/00 (2006.01)
G06F 21/00 (2006.01)

(52) U.S. Cl. ................ 726/26; 726/31; 705/51; 705/57

(58) Field of Classification Search ............ None
See application file for complete search history.

(56) References Cited

U.S. PATENT DOCUMENTS

| | | |
|---|---|---|
| 5,327,556 A | 7/1994 | Mohan et al. |
| 5,347,579 A | 9/1994 | Blandford |
| 5,629,980 A | 5/1997 | Stefik et al. |
| 5,680,580 A | 10/1997 | Beardsley et al. |
| 5,715,403 A | 2/1998 | Stefik |

(Continued)

FOREIGN PATENT DOCUMENTS

JP 11086437 A 3/1999

(Continued)

OTHER PUBLICATIONS

"The Authoritative Dictionary of IEEE Standards Terms, seventh edition", p. 234, copyright 2000.*

(Continued)

*Primary Examiner*—Ponnoreay Pich
(74) *Attorney, Agent, or Firm*—Birch, Stewart, Kolasch & Birch, LLP

(57) ABSTRACT

A method and apparatus for moving contents are discussed. According to an embodiment, the method includes determining whether or not a content is to be moved from a first device to a second device based on copy and movement control information, the copy and movement control information indicating whether or not the content is to be moved; performing an authentication to authenticate the first and second devices with each other; and moving the content from the first device to the second device based on the determination result and the authentication result.

12 Claims, 7 Drawing Sheets

U.S. PATENT DOCUMENTS

| | | | |
|---|---|---|---|
| 6,035,418 | A | 3/2000 | Recio et al. |
| 6,047,103 | A | 4/2000 | Yamauchi et al. |
| 6,069,952 | A | 5/2000 | Saito et al. |
| 6,202,124 | B1* | 3/2001 | Kern et al. .................. 711/112 |
| 6,236,971 | B1 | 5/2001 | Stefik et al. |
| 6,282,573 | B1 | 8/2001 | Darago et al. |
| 6,314,518 | B1 | 11/2001 | Linnartz |
| 6,578,149 | B1 | 6/2003 | Kawamae et al. |
| 6,601,046 | B1* | 7/2003 | Epstein ........................ 705/57 |
| 6,603,576 | B1 | 8/2003 | Nakamura et al. |
| 6,615,192 | B1* | 9/2003 | Tagawa et al. ................ 705/57 |
| 6,636,953 | B2* | 10/2003 | Yuasa et al. ................. 711/161 |
| 6,684,210 | B1* | 1/2004 | Takechi et al. ................. 707/9 |
| 6,700,989 | B1* | 3/2004 | Itoh et al. .................... 382/100 |
| 6,807,534 | B1* | 10/2004 | Erickson ...................... 705/51 |
| 6,834,349 | B1 | 12/2004 | Higurashi et al. |
| 6,847,950 | B1* | 1/2005 | Kamibayashi et al. ........ 705/57 |
| 7,032,059 | B1* | 4/2006 | Yamada et al. .............. 710/313 |
| 7,096,504 | B1* | 8/2006 | Tagawa et al. ................ 726/27 |
| 7,218,736 | B1* | 5/2007 | Nishimura et al. .......... 380/201 |
| 7,245,702 | B1* | 7/2007 | Mahaney ................ 379/15.01 |
| 7,251,729 | B1* | 7/2007 | Park .......................... 713/168 |
| 7,661,144 | B2* | 2/2010 | Jeong .......................... 726/26 |
| 7,665,144 | B2* | 2/2010 | Jeong .......................... 726/26 |
| 7,665,145 | B2* | 2/2010 | Jeong .......................... 726/26 |
| 2001/0012440 | A1 | 8/2001 | Itoi |
| 2001/0042043 | A1 | 11/2001 | Shear et al. |
| 2002/0156742 | A1* | 10/2002 | Ogino et al. .................. 705/57 |

FOREIGN PATENT DOCUMENTS

| | | | |
|---|---|---|---|
| JP | 2000-149417 A | | 5/2000 |
| JP | 2000151677 | * | 5/2000 |
| JP | 2000-200475 A | | 7/2000 |
| JP | 2000-311114 A | | 11/2000 |
| JP | 2000-330870 A | | 11/2000 |
| JP | 2000-353361 | | 12/2000 |
| JP | 2000-357201 A | | 12/2000 |
| JP | 2001-084694 A | | 3/2001 |
| WO | WO 97/14249 A1 | | 4/1997 |
| WO | WO-99/52035 A1 | | 10/1999 |

OTHER PUBLICATIONS

Machine translation for JP2000-151677, 4 pages, printed Apr. 8, 2010.*

"Apparatus and method for moving contents—Patent US200214467(A1)—OTI.com", 2 pages, printed Apr. 8, 2010.*

Unknown author, "Open Mobile Alliance Distinguishes Itself From DRM Patent Pool", 3 pages, printed: Nov. 10, 2009.*

Postel et al, "File Transfer Protocol (FTP)", 69 pages, Oct. 1985.*

Unknown author, "The Latest on DRM Technologies From DRM Watch", 3 pages, printed: Nov. 10, 2009.*

Unknown author, "WIPO—Search National Patent and PCT Collections", 3 pages, printed: Nov. 10, 2009.*

Unknown Author, "ContentGuard—Intellectual Property", printed on Nov. 4, 2009, pp. 1-8.

Unknown Author, "Digital Rights Management Standards News from DRM Watch", printed on Nov. 10, 2009, pp. 1-3.

Unknown Author, "JSR-000300 DRM API for Java", Java Community Process, printed on Nov. 10, 2009, pp. 1-2.

Faultline, "LG is Next Major to take a Licence to Intertrust DRM", The Register, Mar. 30, 2007, pp. 1-4.

Unknown Author, "Open Mobile Alliance Distinguishes Itself from DRM Patent Pool", D&R Headline News, printed Nov. 10, 2009, pp. 1-3.

Postel et al., "File Transfer Protocol (FTP)", Network Working Group, Oct. 1985, pp. 1-69.

Unknown Author, "The Latest on DRM Technologies from DRM Watch", printed Nov. 10, 2009, pp. 1-3.

Unknown Author, "WIPO—Search National Patent and PCT Collections", printed Nov. 10, 2009, pp. 1-3.

Taku et al., "IEEE 1394 Content Protection System", Toshiba Review, vol. 54, No. 7, pp. 34-37, 1999, Published by Toshiba Corporation.

Secure Digital Music Initiative, "SDMI Portable Device Specification, Part I, Version 1.0 ", PDWG Los Angeles, Document No. pdwg99070802, pp. 1-35, Jul. 8, 1999.

* cited by examiner

APPARATUS AND METHOD FOR MOVING CONTENTS AFTER MUTUAL AUTHENTICATION

This application is a continuation of U.S. patent application Ser. No. 11/228,360, filed on Sep. 19, 2005, now U.S. Pat. No. 7,665,145 which is a divisional of U.S. patent application Ser. No. 10/022,889, filed on Dec. 20, 2001 (now U.S. Pat. No. 6,965,975B2). The entire contents of these applications are hereby incorporated by reference. Priority is claimed under 35 U.S.C. §120; and this application claims priority of Application Nos. 17207/2001 and 17208/2001 filed in Korea on Mar. 31, 2001 under 35 U.S.C. §119.

BACKGROUND OF THE INVENTION

1. Field of the Invention

The present invention relates to an apparatus and method for moving contents, particularly, to an apparatus and method for moving contents capable of moving contents having a restricted number of copies to another storage media.

2. Description of the Background Art

Recently, due to rapid growth of computer and communication technologies, information and communication has been more important in everyday life as well as science and business. Particularly, in the current information age, since every country in the world is constructing high speed communications nets competitively, various information will be provided, transmitted and consumed and a considerable part of such information will be secured by the copyright law.

Recorders, video recorders and copy machines using the analogue method make differences in quality between the original and the copy in costs, time and convenience and accordingly, those things can not actually affect the copyright.

However, works on information and communication media such as the Internet affect the copyright much since the copy and the original are 100% identical and through the Internet images and voices as well as texts can be transmitted to the whole world.

Also, in the broadcasting field, the TV transmitting method is digitalized by generalization of the digital compression technology and development of inexpensive receivers and accordingly, copy of contents through broadcasting affects the copyright much.

In the information age where all works such as images and records are digitalized, infringement of the copyright is eased and done in various forms and accordingly, exposing and getting rid of infringement of the copyright is difficult.

Therefore, since writing will is decreased and distribution of intellectual property rights is hindered unless the infringement of intellectual properties is prevented or the technologies for exposing the infringement is prevented, enterprises related to copyrights are making much effort to develop copy protecting technology as a technological means to secure works.

In the present, as a general technology for protecting copy, there is a method of restricting the number of copy to a certain number by inserting a copy control code in a header part of contents. The above technology will be applied to broadcasting contents as the digital broadcasting is popularized and the technology is partly now in use.

FIG. 1 is a schematic block diagram showing a copy apparatus of a conventional digital broadcast receiver.

As shown in FIG. 1, the conventional digital broadcast receiver includes a TV broadcast receiver 100 for receiving contents which a broadcasting station transmitted and a recording apparatus 200 for storing the received contents.

The above TV broadcast receiver 100 includes a receiving unit 110 for receiving the contents and a first storage medium 120 for storing the contents supplied from the receiving unit 110 and the recording apparatus 200 includes a second storage medium 210 for storing the contents transmitted from the first storage medium 120.

The operation of a copying apparatus for the conventional digital broadcasting receiver will be described with reference to accompanied drawings as follows.

The receiving unit 110 of a TV broadcasting receiver receives contents transmitted through transmission media such as broadcast satellite or cable and stores the contents in the built-in first storage medium 120. At this time, the possible number of copy of the contents is decreased by one time.

With the above storage method, the contents can be stored by the storage command of a user or new contents can be continuously stored automatically deleting old contents at a certain time interval according to the composition of the TV broadcast receiver 100.

Later, when the user demands to copy the contents to the second storage medium, the TV broadcast receiver 100 reads the contents from the first storage medium and judges the possible number of copy by analyzing the copy control code inserted in the header part of the contents.

At this time, as shown in FIG. 3, the copy control code uses 2 bits among 4 bits of a synchronous bits in the header part of the data packet and is divided to unrestricted copy, restricted copy, a single copy and no copy according to the set value (00,01,10,11). Also, the other 1 bit is used in an encryption code of the data stream and the least significant bit of the synchronous bits is not used as a reserved bit.

After, the TV broadcast receiver 100 reads the copy control code of the stored contents in the first storage medium, the TV broadcast receiver 100 copy the contents to the second storage medium according to the judged possible number of copy.

Namely, if the copy control code is set as unrestricted copy (S201), the TV broadcast receiver 100 does not convert the copy control code and copies the contents to the second storage medium (S202 and S203), if the copy control code is set as restricted copy (S204), the receiver 100 stores the contents in the second storage medium 210 after decreasing one time from the possible number of copy by converting the copy control code (S205 and S206). On the contrary, if the copy control code is set as no copy, the TV broadcast receiver 100 can not copy the contents to the second storage medium regardless of demand of the user (S207).

By the way, the first storage medium 120 is restricted in the capacity. Therefore, if the copy control code is set as no copy in case the user of the digital broadcast receiver is willing to store the contents for a long time or edit the contents, copying or editing of the contents from the first storage medium 120 to the second storage medium 210 is impossible.

SUMMARY OF THE INVENTION

An object of the present invention is to provide a method and apparatus for moving contents after mutual authentication, which address the limitations and disadvantages associated with the related art.

Another object of the present invention is to provide an apparatus and method for moving contents capable of moving the position of stored contents under the condition that the number of contents is not increased.

Another object of the present invention is to provide an apparatus and method for moving contents capable of efficiently moving contents having a restricted number of copies to another storage media.

To achieve these and other advantages and in accordance with the purpose of the present invention, as embodied and broadly described herein, there is provided an apparatus for moving contents comprising a input unit for inputting contents and a control unit for controlling moving of the contents to other medium by analyzing a copy control code of the contents.

To achieve the above objects, there is provided a method for moving contents comprising the steps of analyzing a copy control code of the contents when a user selects moving of the contents from a first storage medium to a second storage medium and storing the contents the contents in the second storage medium by converting the copy control code of the contents according to the result of analysis.

According to an embodiment, the present invention provides a method for moving contents, comprising: determining whether or not a content is to be moved from a first device to a second device based on copy and movement control information, the copy and movement control information indicating whether or not the content is to be moved; performing an authentication to authenticate the first and second devices with each other; and moving the content from the first device to the second device based on the determination result and the authentication result.

According to another embodiment, the present invention provides a first device for moving contents, comprising: a determination unit configured to determine whether or not a content is to be moved from the first device to a second device based on copy and movement control information, the copy and movement control information indicating whether or not the content is to be moved; and a control unit configured to perform an authentication to authenticate the first and second devices with each other, and to move the content from the first device to the second device based on the determination result and the authentication result.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
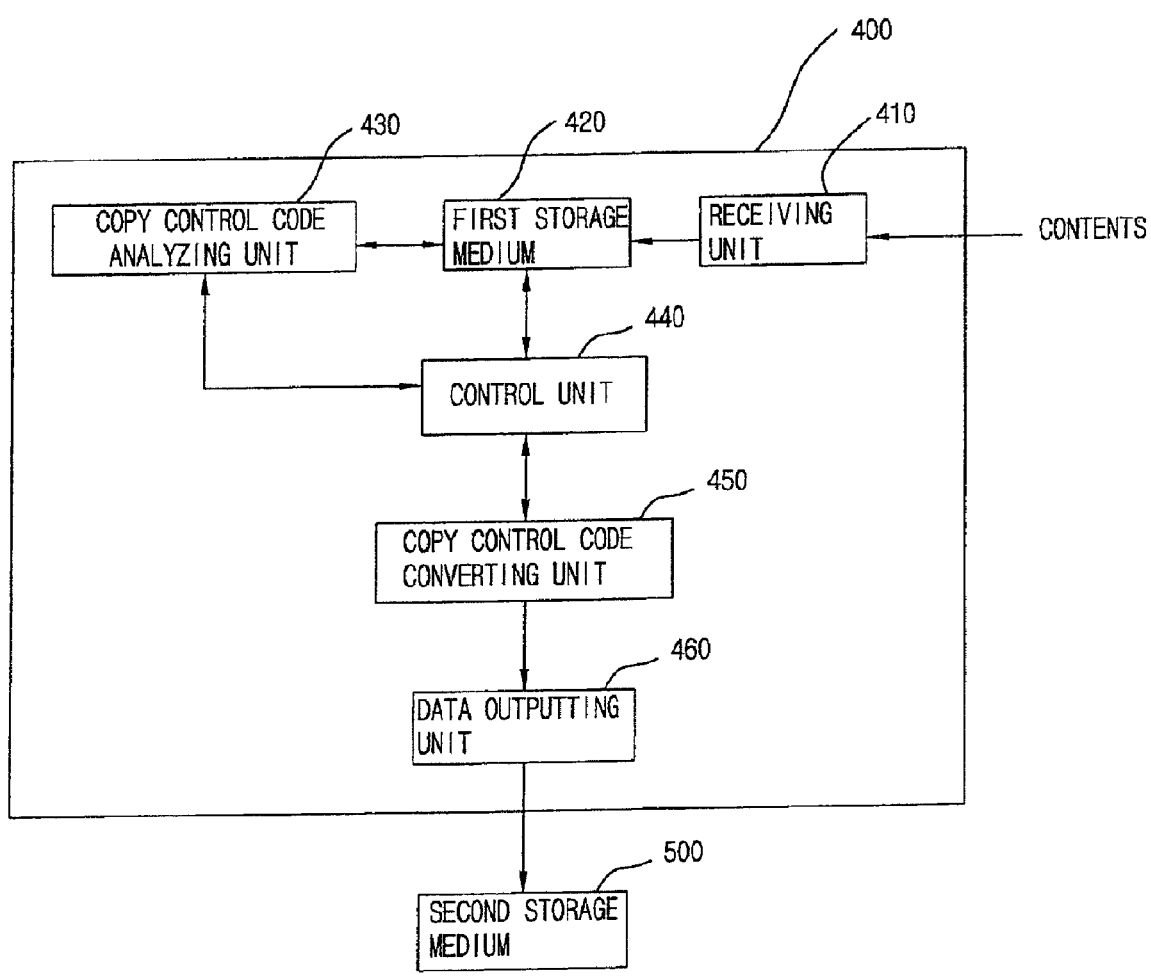
FIG. 4 is a block diagram showing an apparatus for moving contents in accordance with an embodiment of the present invention.

FIG. 4 is a block diagram showing an apparatus for moving contents in accordance with an embodiment of the present invention.

As shown in FIG. 4, an apparatus for moving contents in accordance with the present invention includes a TV broadcast receiver 400 for analyzing a copy control code of contents received from a broadcasting station, converting the copy control code according to the result of the analysis and outputting the converted code and a second storage medium 500 for storing the contents moved from the TV broadcast receiver 400 through an interface means. All the components of the apparatus are operatively coupled and configured.

The TV broadcast receiver 400 includes a receiving unit 410 for receiving the contents, a first storage medium 420 for temporarily storing the contents received from the receiving unit 410, a copy control code analyzing unit 430 for analyzing a copy control code of the contents stored in the first storage medium 320, a control unit 440 for controlling the operation of each unit needed to move the contents such as fetching, deleting and code converting from the first storage medium 420, a copy control code converting unit 450 for converting the copy control code of the contents according to the control of the control unit 440 and a data outputting unit 460 for transmitting contents fetched from the first storage medium having the converted copy control code to the second storage medium.

At this time, the second storage medium 500 can be included in the TV broadcast receiver 400, can be independent out of the receiver using a connection means such as a cable or can be included in another apparatuses (for example, a VCR for performing recording).

Figure 5:
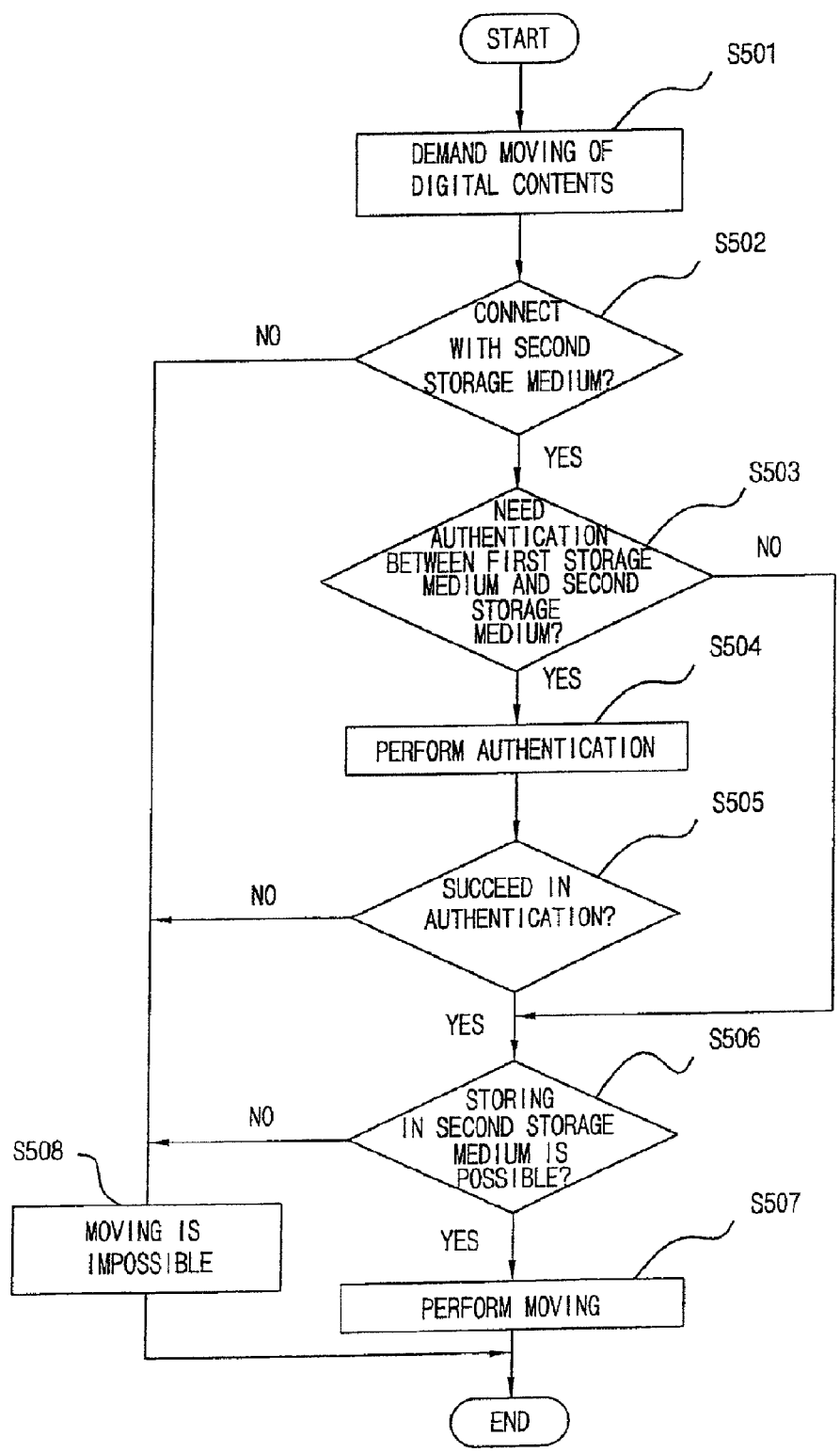
FIG. 5 is a flowing chart showing a method for moving contents in accordance with an embodiment of the present invention.

The operation of the apparatus for the moving the contents in accordance with the present invention will be described with reference to FIGS. 5 and 6.

The receiving unit 410 of the TV broadcast receiver receives the contents transmitted through the media such as a broadcasting satellite or a cable and stores the contents in the first storage medium 420 included in itself. At this time, the possible number of copy of the contents is decreased by one time.

Later, when the user demands moving the contents, the control unit 440 checks whether the TV broadcast receiver and the second storage medium 500 are connected (S501 and S502). If they are connected, the control unit 440 judges whether an authentication is needed between the TV broadcast receiver 400 and the second storage unit 500 by analyzing the copy control code of the contents (S503).

Besides, if the copy control code of contents is set as unrestricted copy, the contents does not need any authentication. But if the copy control code of the contents is set as restricted copy or no copy, the contents are to be authenticated to maintain the restricted number of copy.

Therefore, the control unit 440 performs the step 506 in case the copy control code is set as unrestricted copy. But, in case the copy control code is set as restricted copy or no copy, mutual authentication is performed between the TV broadcast receiver 400 and the second storage medium 500 (S504 and S505). At this time, since the TV broadcast receiver 400 and the second storage medium 500 are authenticated by each peculiar key values, in case a medium rejects the authentication demand or the authentication is not succeeded, moving the contents is not possible (S508).

When the authentication between the TV broadcast receiver 400 and the second storage medium 500 is performed successfully (S505), the control unit controls of moving the contents stored in the first storage medium 420 to the second storage medium 500 only in status which the second storage medium 500 can be written (S506 and S507).

Figure 6:
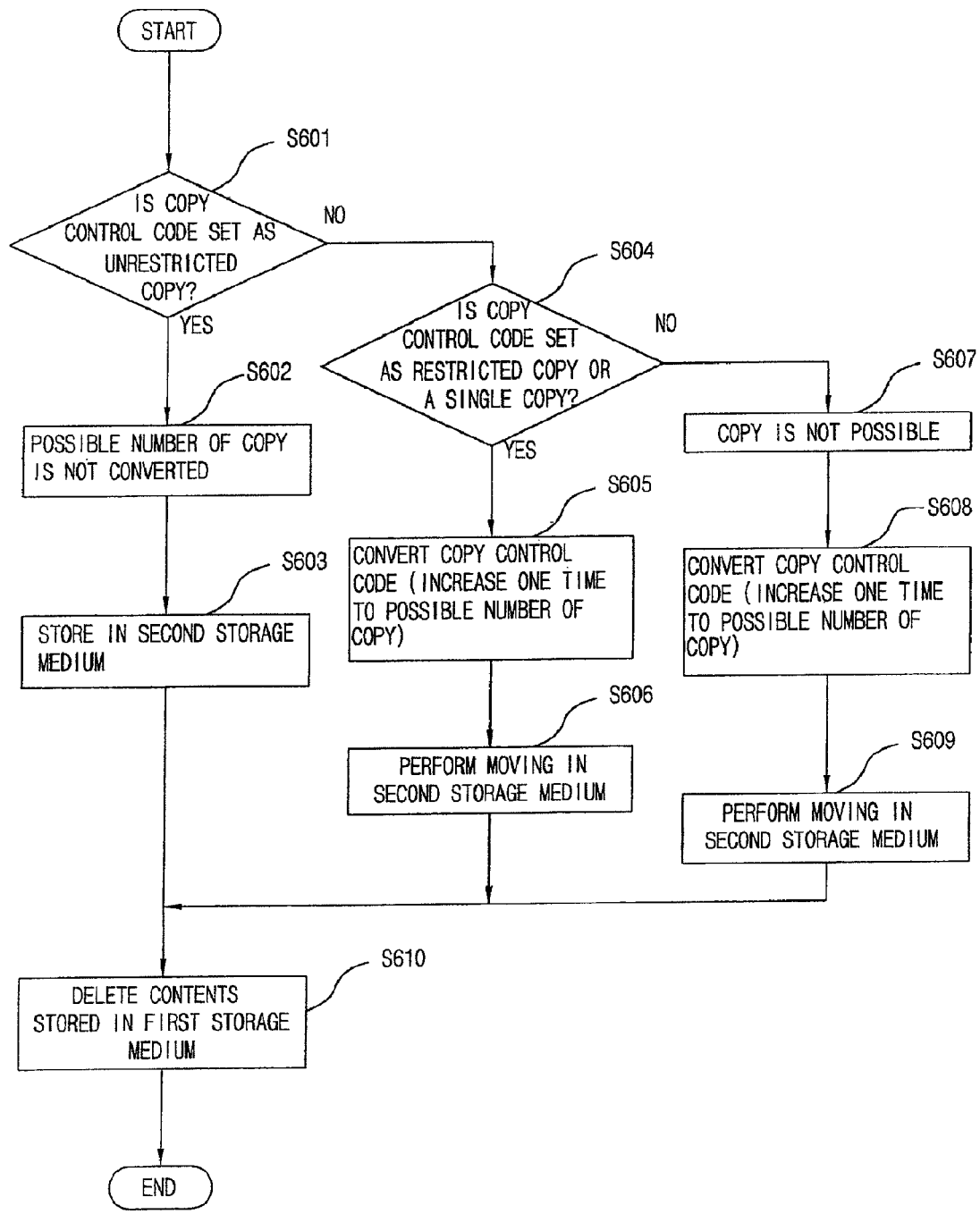
FIG. 6 is a detailed flowing chart showing the step for moving contents of FIG. 5.

FIG. 6 is a detailed flowing chart showing the step of moving the contents (S507).

As shown in FIG. 6, in the step of moving (S507), the moving operation is performed according to the possible number of copy determined by analyzing the copy control code inserted in the header part of the contents.

Namely, if the copy control code is set as unrestricted copy (possible number of copy is N, N=∞), the copy control code is not converted by the copy control code converting unit 450 (S601 and S602). Later, the control unit 440 stores the above contents to the second storage medium 500 through the data outputting unit 460 (S603) and then moving the contents is completed by deleting the original contents in the first storage medium 420 (S610).

Also, if the copy control code is set as restricted copy (N=n), the copy control code of the contents stored in the first storage medium 420 is increased by one time by the copy control code converting unit 450 (S604 and S605). The control unit 440 stores the contents in the second storage medium 500 through the data outputting unit 450 (S606) and then moving of the contents is completed by deleting the original contents in the first storage medium 420 (S610).

Also, if the copy control code is set as no copy (N=0), the copy control code of the contents stored in the first storage medium 420 is increased by one time by the copy control code converting unit 450 (S607 and S608). Here, in case the copy control code is set as no copy, the above contents are divided to copy control code is set as a single copy or no copy before the contents are stored in the first storage medium 420. At this time, in case the copy control code of the contents is set as no copy, this case is not included in the present invention, because the contents cannot be stored in the first storage medium 420. However, in case the copy control code is set as no copy by being stored in the first storage medium 420, the present invention is applied to the case. Later, the control unit 440 stores the contents to the second storage medium 500 through the data outputting unit 460 and then moving the contents is completed by deleting the original written in the first storage medium 420 (S609 and S610).

Since the contents are moved as above, the number of the contents is same as that of before the movement.

As another embodiment from the above moving method, the present invention sets a moving determination bit in the contents in advance and accordingly, moving of the contents can be performed according to the moving determination bit.

Figure 7:
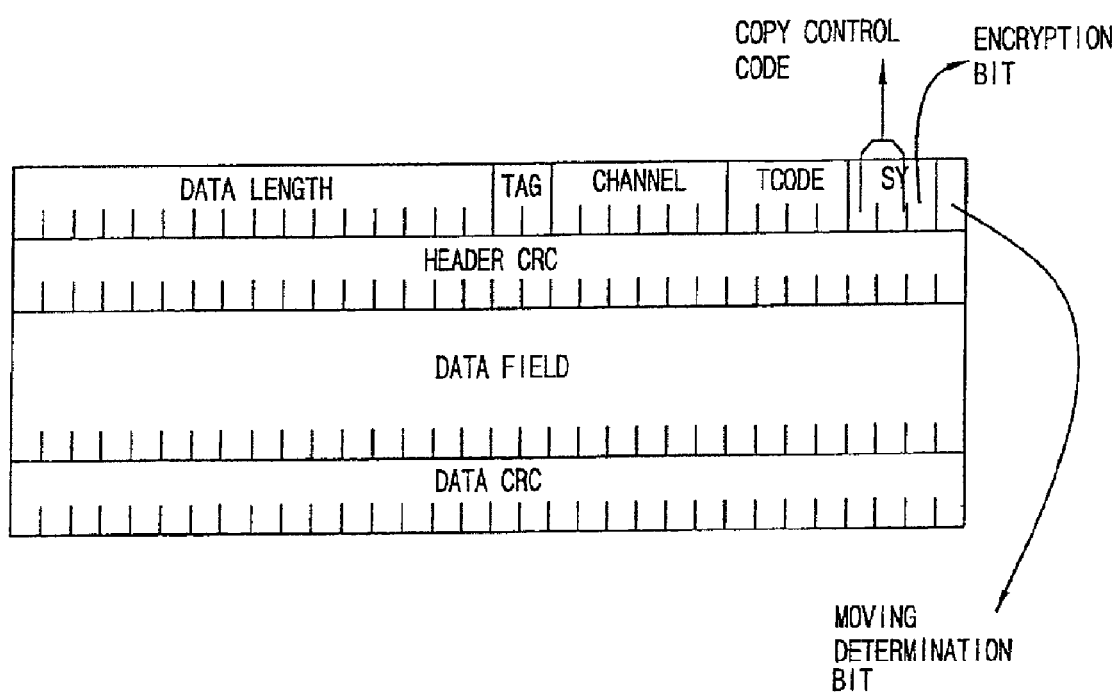
FIG. 7 is a view showing a header of the packet in accordance with an embodiment of the present invention.

Namely, as shown in FIG. 7, the present invention sets the least significant bit as a moving determination bit in the synchronous bits and if the contents can be moved, the moving determination bit is set as '1' and if the contents can not be moved, the moving determination bit is set as '0'.

Therefore, if the user demands moving the contents to the second storage medium 500 after the contents are temporarily stored in the first storage medium 420 by being received in the receiving unit 410 of the TV broadcast receiver 400, the control unit 440 can judge whether the contents can be copied or not in advance according to the moving determination bit after reading the moving determination bit of the contents.

Figure 1:
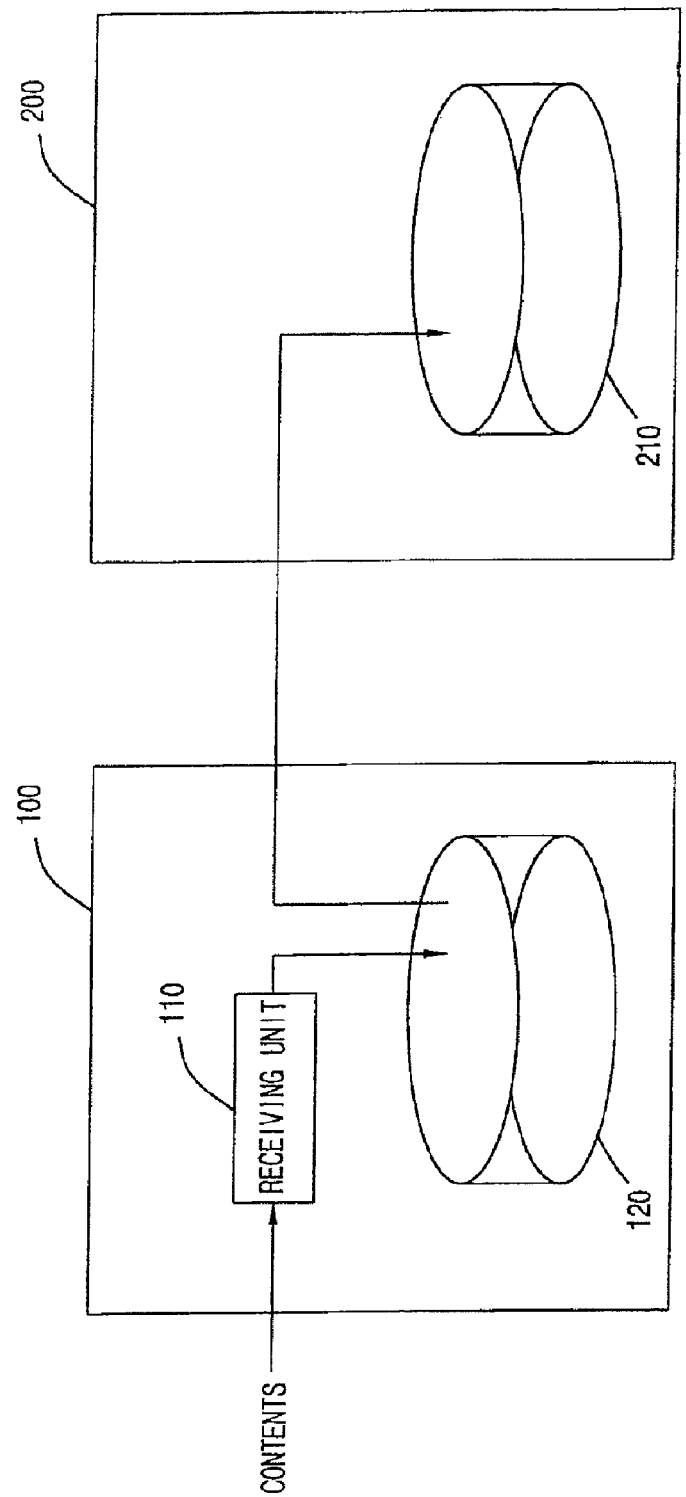
FIG. 1 is a schematic block diagram showing a conventional copy apparatus.
Figure 2:
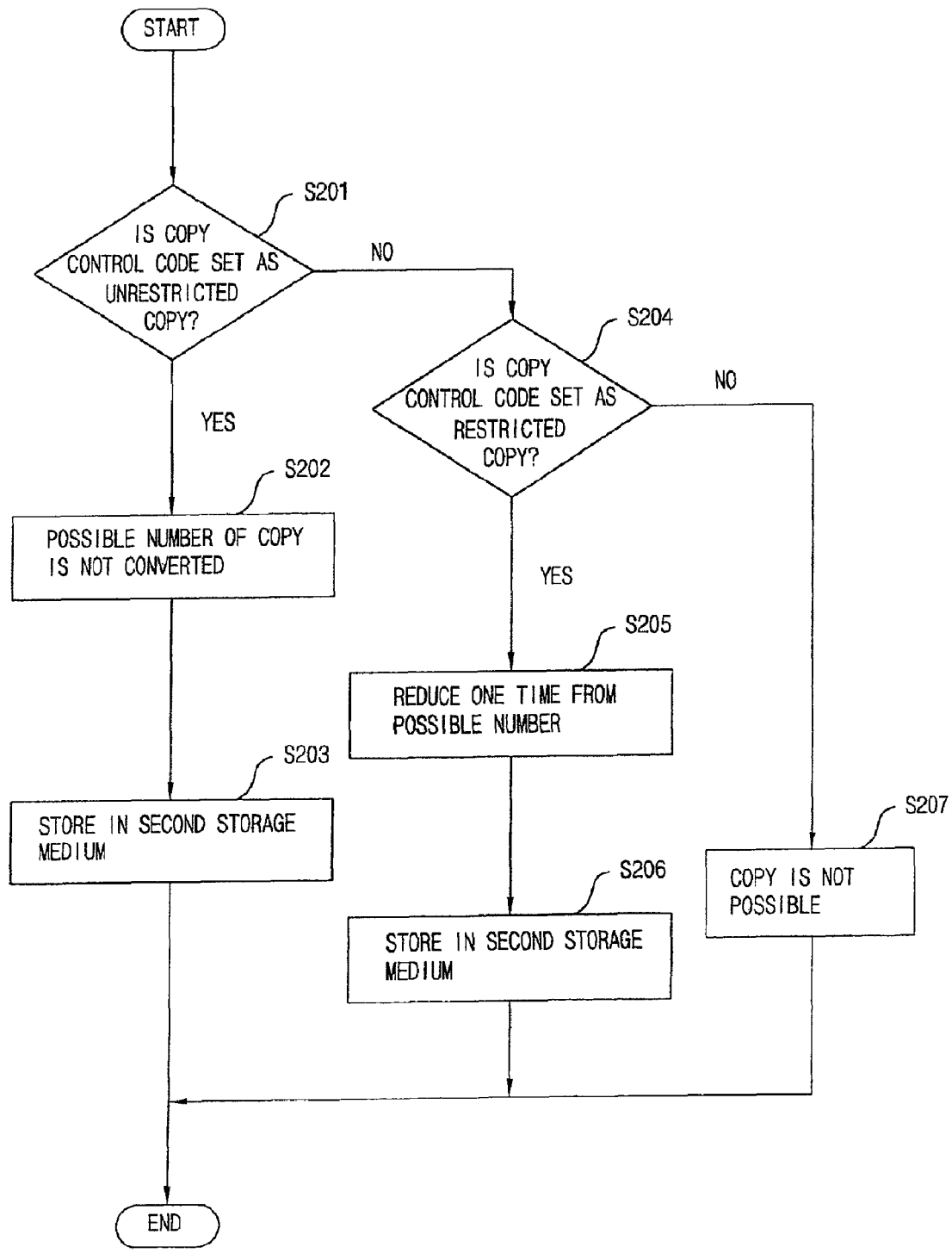
FIG. 2 is a flowing chart showing a method for copying contents of FIG. 1.
Figure 3:
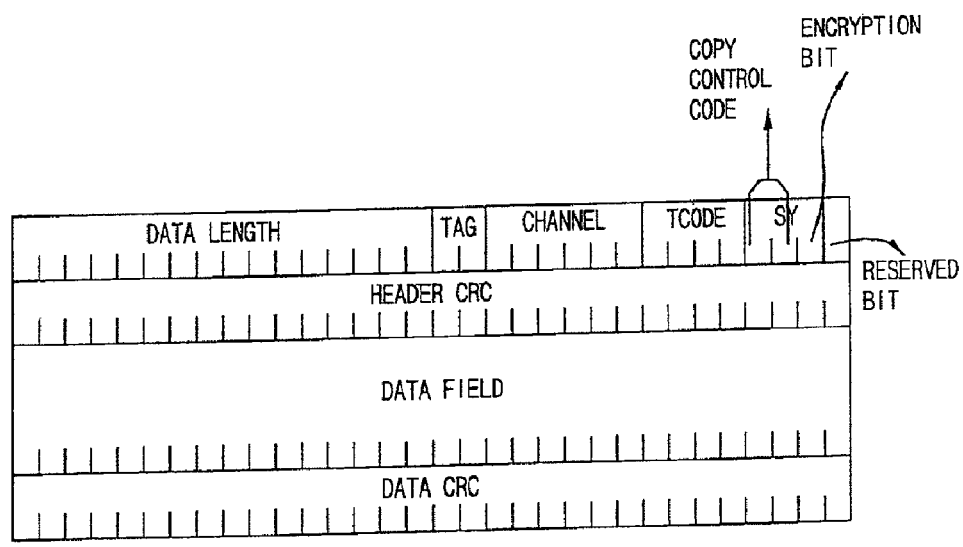
FIG. 3 is a view showing a header of a conventional data packet.

Namely, unless the moving determination bit is set as capable of moving, the contents can not move to the second storage medium 500 and accordingly, the contents can be stored with the copy method as in FIG. 2 of the conventional art. However, if the moving determination bit is set as capable of moving, the contents can be moved in the second storage medium 500 as in the process shown in FIGS. 5 and 6.

As another embodiment from the above TV broadcasting receiver 400, the present invention can be embodied as a processor (not shown) which includes units of TV broadcasting receiver 400, or as a processor (not shown) which is programmed with the above method of moving contents.

The method of moving the contents is that the user moves the contents to the second storage medium 500 by analyzing and converting the copy control code of the contents after the contents is stored the first storage medium 420, as above described. However, the first storage medium 420 can be included in the Personal Video Recorder, and can be included in another apparatuses (for example, Personal Computer, Digital Video Disc, Digital Video Home System) using a connection means (for example, IEEE1394, Universal Serial Bus).

As described above, the apparatus and method for moving the contents can move the storing position of the contents not increasing the number of the contents.

As the present invention may be embodied in several forms without departing from the spirit or essential characteristics thereof, it should also be understood that the above-described embodiments are not restricted by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for moving contents, the method being performed by a device including a receiving unit, a user interface, an analyzing unit, an interface and a control unit, the method comprising:

receiving, via the receiving unit, a content;

storing the content in a storage;

receiving, via the user interface, a request for moving the content;

judging, via the analyzing unit, whether or not the content is permitted to be moved to an external storage based on a moving control information, the moving control information being different from a copy control information indicating whether the copy of the content is permitted;

determining, via the analyzing unit, whether a communication with the external storage through an interfacing port is possible; and controlling, via the control unit, a moving operation of the content to the external storage such that the content is moved to the external storage through the interfacing port, when the judging step determined the content is permitted to be moved and the determining step determines the communication is possible.

2. The method of claim 1, wherein the moving control information is included in a header of a packet of the content.

3. The method of claim 1, wherein the determining step comprises:

determining whether or not an authentication operation with the external storage is required; and authenticating the external storage if the authentication operation is determined to be required.

4. The method of claim 3, wherein the moving operation comprises:
moving the content to the external storage if the authentication operation is successfully performed.

5. The method of claim 3, wherein the moving operation comprises:
moving the content to the external storage without the authentication operation if the authentication operation is determined not to be required.

6. The method of claim 3, wherein the authenticating step performs the authentication using at least one key value.

7. A device for moving contents, the device comprising:
a receiving unit configured to receive data;
a storage configured to store data;
a user interface configured to receive a request from a user;
an interfacing port configured to communicate with an external storage; and
a microprocessor configured to:
receive, via the receiving unit, a content,
store the content in the storage,
receive, via the user interface, a request for moving the content,
judge whether or not the content is permitted to be moved to the external storage based on a moving control information, the moving control information being different from a copy control information indicating whether the copy of the content is permitted,
determine whether a communication with the external storage through the interfacing port is possible, and
control a moving operation of the content to the external storage such that the content is moved to the external storage through the interfacing port, when the judging step determined the content is permitted to be moved and the determining step determines the communication is possible.

8. The device of claim 7, wherein the moving control information is included in a header of a packet of the content.

9. The device of claim 8, wherein the microprocessor is further configured to determine whether or not an authentication operation with the external storage is required, and to authenticate the external storage if the authentication operation is determined to be required.

10. The device of claim 9, wherein the microprocessor is further configured to move the content to the external storage if the authenticating operation is successfully performed.

11. The device of claim 9, wherein the microprocessor is further configured to move the content to the external storage without the authentication operation if the authentication operation is determined not to be required.

12. The device of claim 9, wherein the microprocessor is further configured to perform the authentication operation using at least one key value.

* * * * *